United States Patent [19]

Knecht

[11] Patent Number: 4,965,714
[45] Date of Patent: Oct. 23, 1990

[54] APPARATUS FOR PROVIDING CONFIGURABLE SAFE-STATE OUTPUTS IN A FAILURE MODE

[75] Inventor: Harry L. Knecht, Churchville, Pa.
[73] Assignee: Honeywell Inc., Minneapolis, Minn.
[21] Appl. No.: 263,843
[22] Filed: Oct. 28, 1988
[51] Int. Cl.$^5$ .................. G05B 23/02; G06F 11/16
[52] U.S. Cl. .................................. 364/187; 371/8.1; 371/10.1
[58] Field of Search ................ 364/184–187; 371/8.1, 8.2, 9.1, 10.1

[56] References Cited

U.S. PATENT DOCUMENTS

| | | | |
|---|---|---|---|
| 3,786,433 | 1/1974 | Notley et al. | 364/187 X |
| 4,025,762 | 5/1977 | Rossi et al. | 364/187 |
| 4,141,066 | 2/1979 | Keiles | 364/187 X |
| 4,150,428 | 4/1979 | Inrig et al. | 371/10.1 X |
| 4,437,154 | 3/1984 | Eisele et al. | 364/187 |
| 4,642,753 | 2/1987 | Easthill | 371/10.1 X |
| 4,691,315 | 9/1987 | Murphy et al. | 364/187 X |

FOREIGN PATENT DOCUMENTS 0053204 3/1989 Japan .

OTHER PUBLICATIONS

Genius ™ I/O System, pp. 3-1–4-22, Mar. 1986.
Short—"Microprocessors and Programmed Logic", Prentice-Hall, Inc., 1981, p. 32.

Primary Examiner—Joseph Ruggiero
Attorney, Agent, or Firm—Arthur A. Sapelli; D. J. Lenkszus; A. Medved

[57] ABSTRACT

A process control system includes a processor which outputs command signals to a plurality of field devices via an interface unit. The interface unit comprises a primary output unit for outputting a first set of the command signals to the field devices in response to a first control signal. The first set of command signals are command signals for normal operation of the process control system. A secondary output unit outputs a second set of the command signals to the field devices in response to a second control signal. The second set of command signals are command signals for a failure mode of operation of the process control system. The second set of command signals are temporarily stored by the secondary output unit in order to respond quickly upon detection of an error.

8 Claims, 1 Drawing Sheet

APPARATUS FOR PROVIDING CONFIGURABLE SAFE-STATE OUTPUTS IN A FAILURE MODE

BACKGROUND OF THE INVENTION

This invention relates to a data processing system, and more particularly, to an apparatus for providing safe-state outputs in a failure mode of a process control system.

In a process control system, a process is controlled which generally involves the monitoring and controlling of fluid flow, fluid flow rate, fluid levels, temperature, pressure, position, levels (e.g. tank or vat levels), . . . These parameters are resultants of a process and are measured by a variety of field devices including such devices as valves, flow meters, position indicators, motors, . . . As the process continues, the parameters are being monitored by a main controller, and output signals are generated for controlling the various field devices (or field equipment) or interposing control relays that connect to the field devices. An apparatus, referred to herein as an output device, interfaces with the field devices and outputs control signals (or command signals) to the field devices. In the event of a failure in the system, there is a need to output signals to the field devices which define a predetermined, selectable (i.e., configurable) default condition for the devices. The apparatus of the present invention provides a predetermined output signal to the field devices, including a way of "online" testing the apparatus.

SUMMARY OF THE INVENTION

Therefore, there is supplied by the present invention, an apparatus for providing safe-state outputs in a failure mode of a process control system. The process control system includes a processor which outputs command signals to a plurality of field devices via the apparatus. The apparatus, an interface unit, comprises a primary output unit, operatively connected to the processor, for outputting a first set of the command signals to the field devices in response to a first control signal. The first set of command signals are command signals for normal operation of the process control system. A secondary output unit, operatively connected to the processor, outputs a second set of the command signals to the field devices in response to a second control signal. The second set of command signals are command signals for a failure mode of operation of the process control system. The second set of the command signals are temporarily stored by the secondary output unit.

Accordingly, it is an object of the present invention to provide an apparatus for providing safe-state outputs.

It is another object of the present invention to provide an apparatus for providing safe-state outputs in a failure mode.

It is a further object of the present invention to provide an apparatus for providing safe-state outputs in a failure mode which can be tested on-line.

These and other objects of the present invention will become more apparent when taken in conjunction with the following description and attached drawing, which drawing forms a part of the present application.

DETAILED DESCRIPTION

Figure 1:
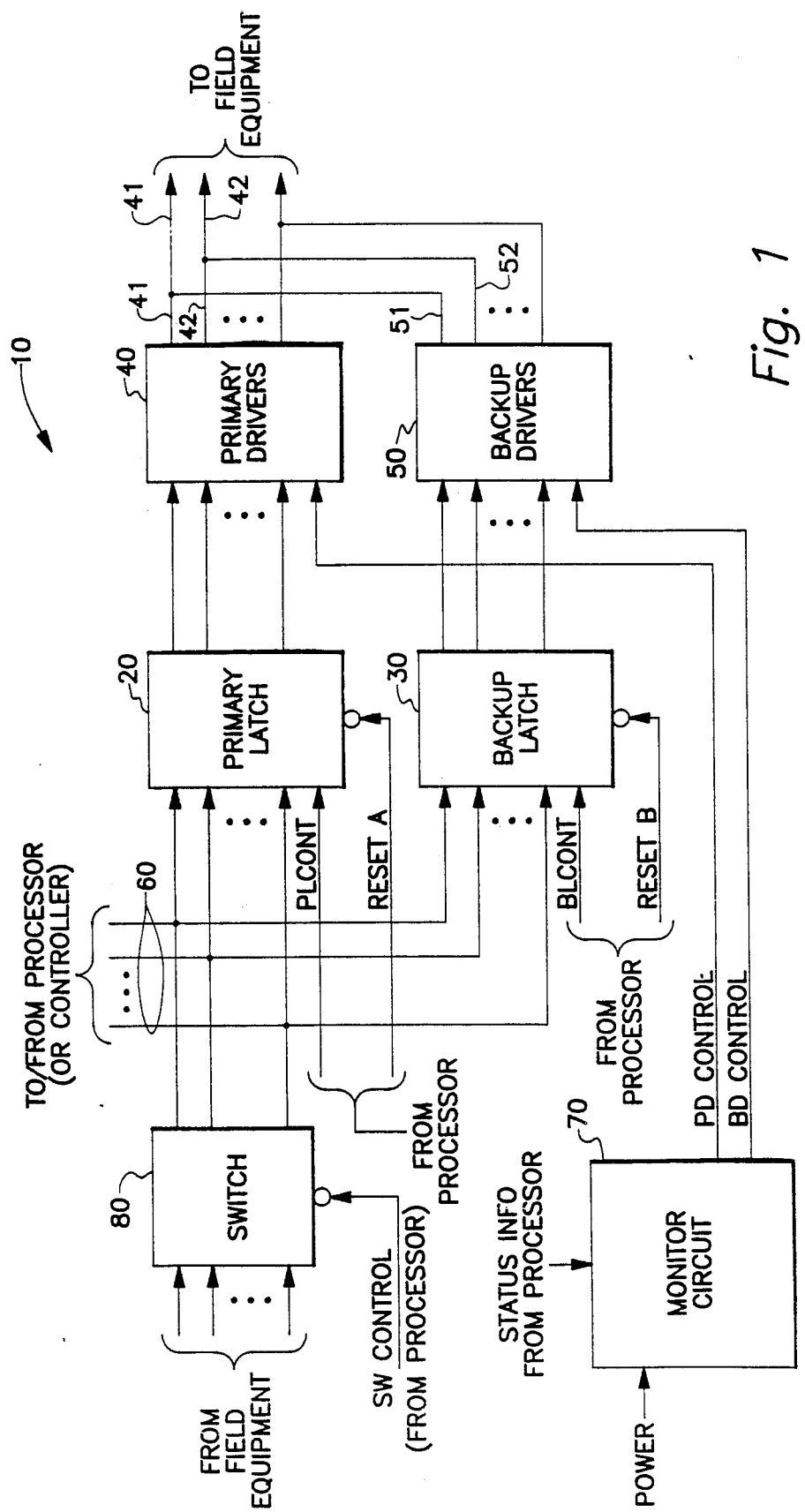
FIG. 1, the sole drawing of the present application, shows a functional block diagram of the apparatus of the preferred embodiment of the present invention.

Referring to FIG. 1, there is shown a block diagram of the apparatus of the preferred embodiment of the present invention. The apparatus of the preferred embodiment of the present invention is essentially an interface device 10 for interfacing a controller (not shown) to field devices (or field equipment, not shown) such as motors, valves, . . . The interface device 10 (sometimes referred to herein as an output device) provides output signals to the field equipment or field devices (not shown).

The output device 10 includes a primary latch 20, and a backup latch 30. Both the primary latch 20 and the backup latch 30 are coupled to the processor (not shown), the primary latch 20 of the preferred embodiment of the present invention having a plurality of individual digital inputs, and the backup latch 30 having a plurality of inputs corresponding to the primary latch 20. Associated with the primary latch 20 is a primary driver 40, and associated with the backup latch 30 is a backup driver 50. The outputs of the primary latch 20 are coupled to the inputs of corresponding drivers 40, and similarly the outputs of backup latch 30 are coupled to corresponding inputs of the backup driver 50. The outputs of the primary drivers 40 are coupled to predetermined field equipment (not shown). The corresponding outputs of the backup drivers 50 are also coupled to the corresponding outputs of the primary drivers 40. Thus, output 51 of backup driver 50 is coupled to the output 41 of primary driver 40, output 52 of backup driver 50 is coupled to the output 42 of primary driver 40, . . . Further, for example purposes only, output 41 may be operatively connected to a predetermined valve (not shown), output 42 may be operatively connected to a motor (not shown), . . . In the preferred embodiment of the present invention, the primary latch 20 and the backup latch 30 each comprise an integrated circuit chip type 74273, an Octal-D Type Flipflop. In the preferred embodiment of the present invention the primary drivers 40 and the backup drivers 50 each comprise an integrated circuit chip ULQ2803, an Octal Peripheral Driver Array.

In operation, the processor outputs the digital values to the primary latch 20 via a bidirectional bus 60, the digital values to be received by the corresponding field equipment (not shown). Along with outputting the digital values, the processor also outputs a control signal PLCONT which clocks the digital values (or digital data) into the primary latch 20. In normal operation a monitor circuit 70 outputs a control signal, PDCONTROL which enables the primary drivers 40. As the process continues in a normal operating mode, the processor (not shown) continues to output the digital data to the primary latch 20, thereby providing the necessary control signals to the field equipment via the primary latch and the primary driver 40. At the start of the operation, the processor also outputs the safe digital values (also referred to as safe-state values or outputs) to the backup latch 30 via the bidirectional bus 60. For that particular transmission or output, the processor outputs a control signal, BLCONT, to the backup latch, thereby allowing the safe digital values to be stored in backup latch 30.

At that time the control signal to the primary latch PLCONT is not outputted. An enable signal BDCONTROL which is coupled from the monitor circuit 70 to the backup driver 50 is such that the backup drivers are not enabled, thereby inhibiting the safe outputs stored in backup latch 30 from being outputted to the field equipment. The monitor circuit 70 receives status information from the processor; namely, the monitor circuit monitors a watchdog timer coupled from the processor to insure that the processor is still operating correctly. Also the monitor 70 receives power input from a local power regulator (not shown) and monitors the power available to the circuitry of the interface device 10, thus insuring that the interface device 10 has the necessary power to provide the output signals to the field equipment. The monitor circuit 70 also includes a backup power in order to insure the ability of the monitor circuit 70 to drive the output signals of the interface device. The monitor circuit 70 of the preferred embodiment of the present invention includes an integrated circuit chip, National Semiconductor LM140L-5, a 3-terminal regulator, and some supporting circuitry. The circuitry which performs the monitoring functions is well known to those skilled in the art and will not be discussed further herein.

In the event an error or a malfunction is detected by the monitor circuit 70, the monitor circuit 70 outputs the BDCONTROL control signal to the backup driver 50 and removes the PDCONTROL enable signal to the primary driver 40, thereby enabling the safe-state output signals stored in backup latch 30 to be outputted to the field equipment. The control enable signals PDCONTROL and BDCONTROL to the primary driver 40 and the backup driver 50, respectively, are either/or signals, such that one and only one control enable signals is outputted as a function of the monitoring function, i.e. if everything is determined to be operating normally the primary driver is enabled, and if any malfunction or anomaly is detected by the monitor circuit the backup driver is enabled.

The operation described above utilizes an approach in which predetermined safe-state outputs are stored in the backup latch 30; however, the safe-state may be determined to be the same state prior to detecting the failure. In that case, it will be understood that the processor operation in that mode enables the control signals to both the primary latch 20 and the backup latch 30 each time a digital value is outputted from the processor, PLCONT and, BLCONT are enabled. However, in the normal mode, only PDCONROL is enabled.

The interface device 10 of the present invention provides a way of testing the outputs by including a switch 80. The switch 80 basically receives status information from the field equipment, which essentially reflects the output information from the primary drivers 40 or the backup drivers 50. The output of the switch 80 is coupled to corresponding bus lines of bidirectional bus 60. In a test mode, the processor enables the switch 80 via a control enable signal, SWCONTROL, and reads the information transmitted from the field equipment to verify that the information received is as expected. The processor can also enable the backup latches and read the information stored in the backup latches via the information received from the field equipment through switch 80, to verify that the backup latches contain the safe-state data as expected. This can be done even in a normal operating mode since the field devices are generally slow devices and will not be effected by any variation in the outputs transmitted via the primary driver 40 or backup driver 50. In this fashion the total loop between the interface device 10 and the field devices can be verified. If the processor does not receive the expected data, the processor can initiate a failure mode by notifying the monitor circuit 70 that it has detected an error.

It will be understood by those skilled in the art that the output data to the field equipment can be analog data in digital form. The switch 80 of the preferred embodiment of the present invention is an integrated circuit chip, octal buffers and line drivers with 3-state output, type 74/244. Although the backup latch of the preferred embodiment is set by the processor, it will be understood by those skilled in the art that the backup latch 30 can be set manually. Further, it will also be understood that the output to be field equipment is not limited to eight (8), as described herein.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. In a process control system, there is included a processor which outputs command signals to a plurality of field devices via an interface unit, said interface unit comprising:

(a) a primary output means, operatively connected to said processor, for storing a first set of said command signals received from said processor, to output said first set of command signals to said field devices in response to a first control signal, said first set of command signals being command signals for normal operation of the process control system; and (b) secondary output means, operatively connected to said processor, for storing a second set of said command signals received from said processor, to output said second set of command signals to said field devices in response to a second control signal, and said second set of command signals being command signals for a failure mode of operation of the process control system, the second set of said command signals being temporarily stored by the secondary output means.

2. An interface unit according to claim 1, said interface unit further comprising: monitor means, operatively connected to said processor, to said primary output means, and to said secondary output means, for monitoring the normal operation of the process control system to detect any failures, errors, and anomalies of the normal operation, and to generate the first and second control signal corresponding to the results of the monitoring, wherein said first control signal is active for normal operation and said second control signal is active for a failure mode of operation.

3. An interface unit according to claim 1, said interface unit further comprising: switch means, having input terminals for receiving status signals from said field devices wherein said status signals correspond to the first set of command signals or the second set of command signals corresponding to whether the primary output means or the secondary output means, respectively, is active, and further wherein said switch means is operatively connected to said processor, for operatively coupling said status signals to said processor in response to a third control signal, said third control signal being initiated by said processor, thereby permitting said processor to verify the operability of the output path from the processor to the field devices.

4. An interface unit according to claim 2, said interface unit further comprising: switch means, having input terminals for receiving status signals from said field devices wherein said status signals correspond to the first set of command signals or the second set of command signals corresponding to whether the primary output means or the secondary output means, respectively, is active, and further wherein said switch means is operatively connected to said processor, for operatively coupling said status signals to said processor in response to a third control signal, said third control signal being initiated by said processor, thereby permitting said processor to verify the operability of the output path from the processor to the field devices.

5. An interface unit according to claim 4, wherein said primary output means comprises:
   (a) primary storage means, for temporarily storing said first set of command signals in response to a fourth control signal, said fourth control signal being initiated by said processor; and
   (b) primary driver means, operatively connected to said primary storage means, for outputting the first set of command signals temporarily stored in said primary storage means to said field devices in response to the first control signal.

6. An interface unit according to claim 5, wherein said secondary output means comprises:
   (a) secondary storage means, for temporarily storing said second set of command signals in response to a fifth control signal, said fifth control signal being initiated by said processor; and
   (b) secondary driver means, operatively connected to said secondary storage means, for outputting the second set of command signals temporarily stored in said secondary storage means to said field devices in response to the second control signal.

7. An interface unit according to claim 4, wherein said secondary output means comprises:
   (a) secondary storage means, for temporarily storing said second set of command signals in response to a fifth control signal, said fifth control signal being initiated by said processor; and
   (b) secondary driver means, operatively connected to said secondary storage means, for outputting the second set of command signals temporarily stored in said secondary storage means to said field devices in response to the second control signal.

8. An interface unit according to claim 5, wherein said secondary output means comprises:
   (a) secondary storage means, for temporarily storing said second set of command signals in response to said fourth control signal; and
   (b) secondary driver means, operatively connected to said secondary storage means, for outputting the second set of command signals temporarily stored in said secondary storage means to said field devices in response to the second control signal.

* * * * *